United States Patent [19]

Chen

[11] Patent Number: 5,727,142

[45] Date of Patent: Mar. 10, 1998

[54] METHOD FOR A NON-DISRUPTIVE HOST CONNECTION SWITCH AFTER DETECTION OF AN ERROR CONDITION OR DURING A HOST OUTAGE OR FAILURE

[75] Inventor: Shawfu Chen, New Milford, Conn.

[73] Assignee: International Business Machines Corporation, Armonk, N.Y.

[21] Appl. No.: 642,543

[22] Filed: May 3, 1996

[51] Int. Cl.[6] .................................................. G06F 11/08
[52] U.S. Cl. ................. 395/181; 395/182.11; 364/268; 364/268.1; 364/269
[58] Field of Search ..................... 395/181, 182.09, 395/182.1, 182.11, 182.13, 182.14

[56] References Cited

U.S. PATENT DOCUMENTS

| | | | |
|---|---|---|---|
| 5,084,816 | 1/1992 | Boese et al. | 395/575 |
| 5,088,032 | 2/1992 | Bosack | 395/200 |
| 5,129,080 | 7/1992 | Smith | 395/575 |
| 5,170,394 | 12/1992 | Biber et al. | 370/94.1 |
| 5,291,597 | 3/1994 | Shorter et al. | 395/650 |
| 5,303,383 | 4/1994 | Neches et al. | 395/500 |
| 5,319,773 | 6/1994 | Britton et al. | 395/575 |
| 5,321,813 | 6/1994 | McMillen et al. | 395/200 |
| 5,371,852 | 12/1994 | Attanasio et al. | 395/200 |
| 5,384,783 | 1/1995 | Satomi et al. | 395/575 |
| 5,384,840 | 1/1995 | Blatchford et al. | 379/229 |
| 5,404,503 | 4/1995 | Hill et al. | 395/575 |
| 5,404,537 | 4/1995 | Olmowich et al. | 395/725 |
| 5,428,783 | 6/1995 | Lake | 395/650 |
| 5,473,599 | 12/1995 | Li et al. | 395/182.02 |
| 5,495,582 | 2/1996 | Chen et al. | 395/200.12 |

OTHER PUBLICATIONS

Hall et al., "Single System Image and Load Balancing with Parallel Session Support for Network Access to a Loosely–Coupled Processor Complex", IBM Tech. Disclosure Bul., vol. 38 No. 09, Sep. 1995, pp. 505–507.

*Primary Examiner*—Robert W. Beausoliel, Jr.
*Assistant Examiner*—Dieu-Minh Le
*Attorney, Agent, or Firm*—Lily Neff

[57] ABSTRACT

A method for a non-disruptive TCP connection switch is introduced that allows the re-establishment of communications between a remote host and a new host when the host originally in processing communication with the remote host takes an outage. The present invention particularly relates to loosely coupled environments connecting to a TCP/IP network. The method involves three important steps of initialization, during which all hosts and remote hosts are identified by a communication box; failure detection step during which a host outage is detected by the communication box; and re-registration step during which the communication box provides and re-establishes processing connection between the remote host and a new host replacing the initial failing host.

1 Claim, 3 Drawing Sheets

METHOD FOR A NON-DISRUPTIVE HOST CONNECTION SWITCH AFTER DETECTION OF AN ERROR CONDITION OR DURING A HOST OUTAGE OR FAILURE

FIELD OF INVENTION

This invention is directed to a method of maintaining a connection between a remote host and a host in a loosely coupled environment through use of a communication box or an Offload Frontend Box.

BACKGROUND OF THE INVENTION

Loosely coupled environments are computer system complexes that comprise of a number of processors that share data storage and communications networks. Each complex, however, retains its own dedicated memory which is not usually shared between such complexes. Each processor in the environment can access all data on the shared databases and can run any application program stored in the data storage. This allows the presentation of a single image to the remote host or user and allows workload balancing by the processor complexes. The remote host or user does not care which of the coupled processors executes the application, allowing more effective workload balancing without operator or end user action.

Data processing systems are employed within loosely coupled environments to maintain data needed in different locations throughout the environment to service the processing of different applications. The data may be maintained in one or more host systems linked to the remote hosts and to other host systems forming a network of communication links in the environment. In order to send messages from one host on the link to another host on the link, communication rules called protocols are established to control the communication by routing messages and accessing appropriate host computers on the link in the complex or the environment. These communications protocols typically exists as part of a teleprocessing architecture that defines the function and structure of data communications products.

When a remote host sets up communication with a host in order to request processing of an application, extensive time and effort goes into setting up the communication link since the remote host has to be associated with the host carrying the application through the passing of certain information including the appropriate communication protocol. If the host then is unable to complete the processing of the application because of a subsequent outage, a failure or some sort of an error condition detected by the environment, the remote host has to duplicate the initial effort spent in setting communication with the now failing host in order to establish a second communication link with a replacement host. Furthermore, the need to re-established a new connection, will cause loss of data that had been sent previously over the pre-existing connection between the remote host and the now failing host.

SUMMARY OF THE INVENTION

A method of maintaining a connection through use of an Offload Frontend Box between a remote host and a host in a loosely coupled environment is described during a host outage or when a failure or error condition has been associated with the host. The method comprises the steps of identifying all host and remote hosts participating in the loosely coupled environment during an initialization step. Providing failure and error detection through the Offload Frontend Box, during which the affected host is detected and identified. Conducting a re-registration step during which a new host takes over the place of the affected host in order to provide the same services as the affected host to the remote host without any effort on the part of the remote host in order to re-establishing a new communication.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
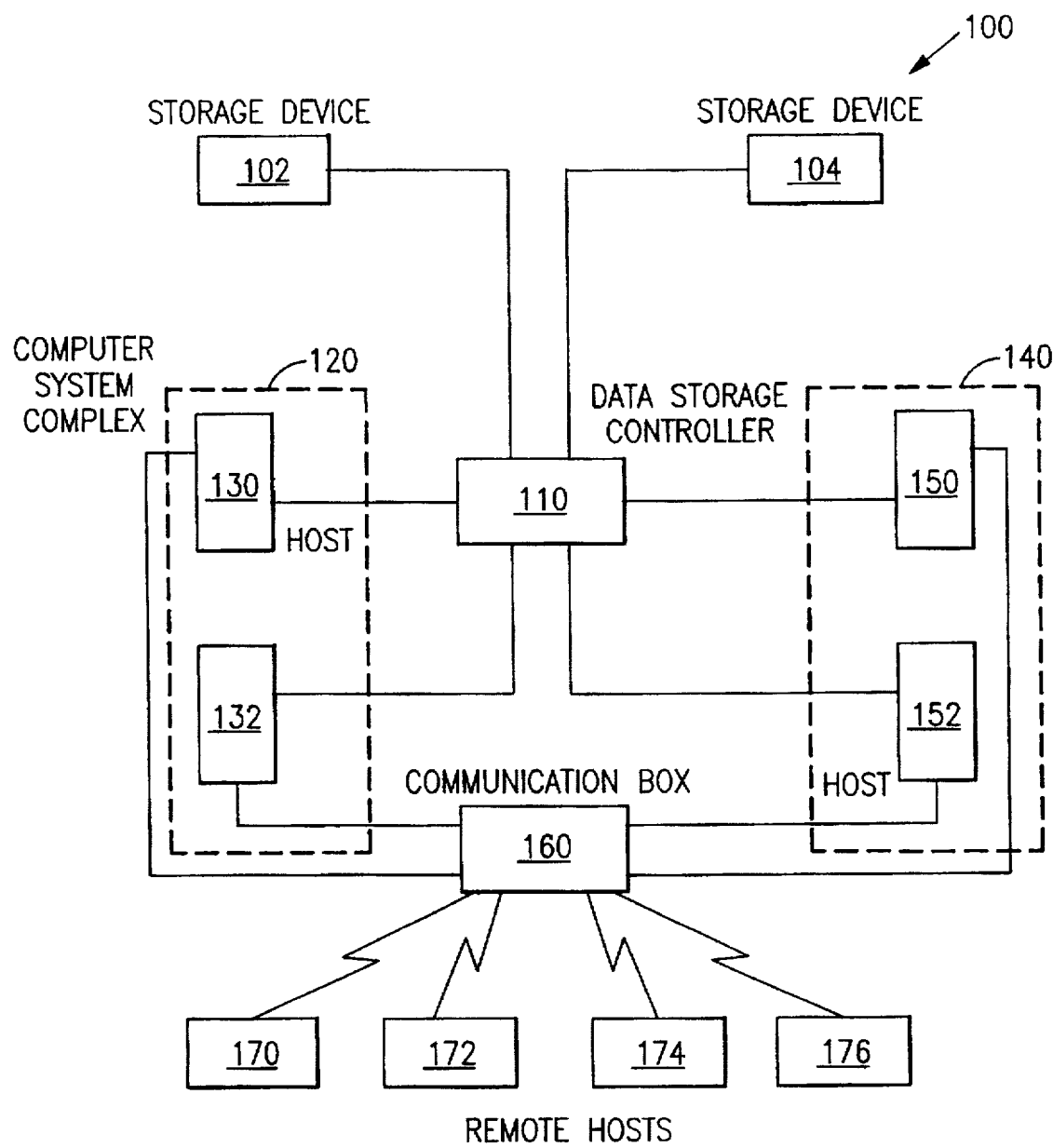
FIG. 1 is a block diagram of a loosely coupled processor environment such as the one used in the present invention.

A loosely coupled environment is shown generally in FIG. 1 as 100. The environment comprises a plurality of processor complexes 120 and 140, a plurality of data storage devices 102, 104 and at least one data storage controller 110. Each processor complex further comprises a plurality of computer systems or hosts 130, 132, 140, 142 as well as main memory and one or more processing elements and input/output channels (not shown). The processors are then each a complete system such as IBM ES/9000 computer system in themselves (ES/9000 is a trademark of IBM Corp.) A loosely coupled environment can have two or more connected systems with eight systems being a typical number.

The computer systems or the local hosts (hereinafter hosts) share access to data storage devices through the shared data storage controller(s). The shared data storage controller and the data storage devices can be any of such devices available commercially such as IBM 3990 Disk Control Unit and IBM 3990 Disk Storage Units.

The hosts are connected through a communication box or an Offload Frontend Box 160, such as IBM 3172 communication box, to the remote hosts 170, 172, 174 and 176. The communication box performs several functions among which are the task socket/routing elements in an effort to match up the remote host with the processing host responsible for running the requested application. The remote hosts can be any type of intelligent devices such as an IBM PS/2 Personal Computer (PS/2 is a trademark of IBM Corp.) The remote hosts, however, must be capable of running a communication program to communicate with the host systems.

When a remote host sets up communication with one of the hosts for the processing of a certain application, the network of host system comprise different kinds of communication links with different kind of host computers connected to those links. In order for messages to be sent from one host on the link to another host on the link, rules, called protocols are established to control the communication links, route messages, and access appropriate host computers on the link.

Figure 2:
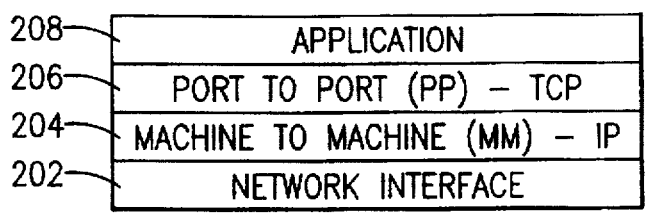
FIG. 2 is a block diagram showing conceptual layering of communication protocols used.

The communication protocols can be conceptually viewed as being layered, as depicted in FIG. 2, with each protocol layer making use of the services provided by the layer beneath it. The lowest layer is the Network Interface 202 which deals at the hardware level and controls the transmission of data between hosts on a single network of a particular type. The next higher layer is the Machine-to-Machine (MM) 204 layer which provides the capability to communicate between hosts that are not directly connected to the same physical complex. A widely used example of this layer is an Internet Protocol (IP). Internet IP is a standard industry communication protocol which allows the use of standard software communication packages.

The next higher layer of protocol is the Port-to-Port (PP) 206 layer that allows multiple processes executing different application programs to communicate with remote processes at remote hosts all at the same time. The PP layer uses the MM protocol layer to transfer data between host machines. The PP layer presents an interface to the application layer which allocates a local communication port to a process, connects that port to a remote port on a remote host, and transfers data between the local port and the remote port. Examples of such PP transport protocols are TCP (Transmission Control Protocol), UDP (User Datagram Protocol) and XNS (Xerox Network System). TCP is capable of operating with devices using IP suite of protocol (TCP/IP).

Figure 3A:
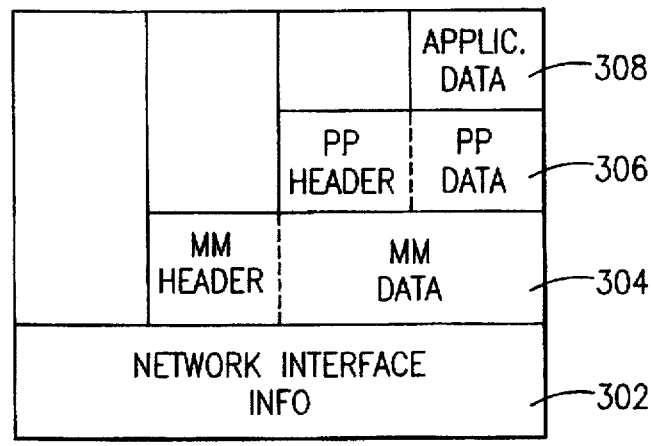
FIGS. 3A through 3C shows data diagrams illustrating type of protocol information needed for establishing a successful communication.
Figure 3B:
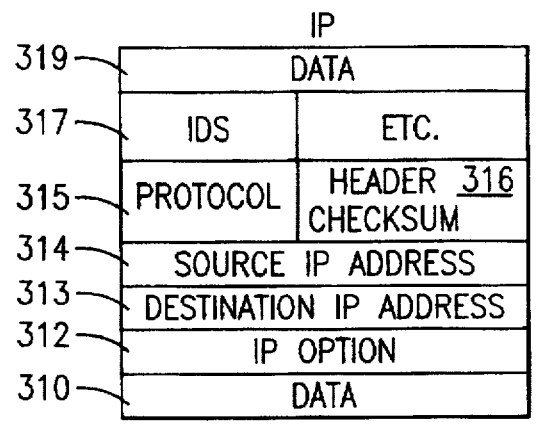
Figure 3C:
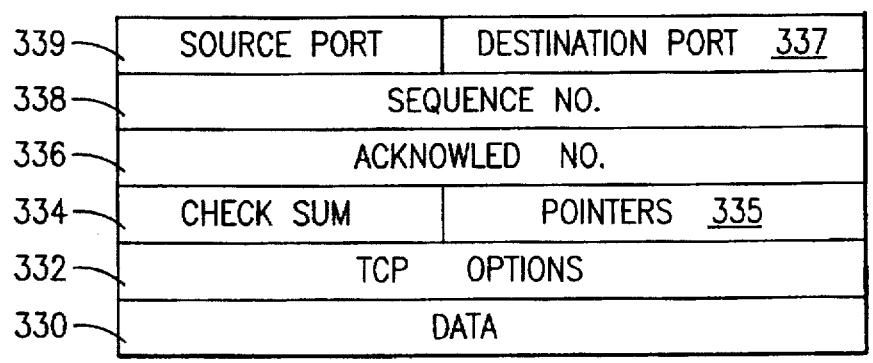

In a loosely coupled environment connecting as an example to a TCP/IP network when a connection is established between the host and the remote host, the communication protocol involves the passing of a lot of information in order to Associate a socket connected to the remote host to an application in the local host. FIGS. 3A, 3B and 3C is an example of the information that needs to be passed along in a TCP/IP type network. While FIG. 3A depicts more general information that has to be passed in order to established each layer of protocol, FIGS. 3B and 3C show in more detail the required information for an IP type communication and a TCP type communication respectively.

In a preferred embodiment of the present invention, the communication box 160 performs as an Offload Frontend Box for offloading communication protocol processing from the loosely coupled environment. Communication protocol processing includes flow control, error detection and recovery, segregation of large messages into smaller units for communication, routing messages and other functions. The execution of such functions requires various logic such as buffer allocation, timer management, data movement and interprocess coordination. Offloading protocol processing relieves the environment's processors from consuming time and effort that can be applied to computing and data server functions.

In a preferred embodiment of the present application, the communication box is used as an Offload Frontend Box in order to allow a host to offload its TCP/IP functions into a TCP/IP Offload Frontend Box. In a loosely coupled environment such as the one described above connecting to TCP/IP network through the TCP/IP Offload Frontend box, when the local host takes an outage, or when the Offload Frontend box detects a failure, mismatch or an error condition, the remote host or remote TCP/IP workstation that is connected to that host will subsequently lose the connection to the host and will need to re-establish a TCP connection. This, however, will cause the remote host not only to lose the connection information such as the ones shown in FIGS. 3A through 3C, but also to lose data that has been sent over that connection including any data associated with the application itself (as depicted in FIG. 3A. 308).

The present invention, however, provides for a method of allowing the remote host to maintain communication and transfer its connection to a subsequent host when and if an outage or other conditions occur.

When a host offloads its TCP/IP functions into the TCP/IP Offload Frontend Box, a TCP/IP connection with a remote TCP/IP host really ends in the Offload Frontend Box. There is then an Association of a socket in TCP/IP Offload Box and an application in the local host that is maintained by the Offload Frontend Box. When the local host processing the requested application then takes an outage or is detected to have a failure or an error condition, the Association is taken over rather than destroyed by the Offload Frontend box. By allowing the Association to be taken over, the present invention allows another local host to commence processing the application, and at the exact location where the previous host had took the outage, and re-establish the Association. The Offload Frontend Box can thus forward data to the new host without breaking current connection with the remote host. This accomplishes a non-disruptive connection re-establish causing the remote host to switch to another host without any efforts on the part of the remote host, which in turn achieves greater availability of the environment without a need to add software to all remote TCP/IP hosts.

Figure 4:
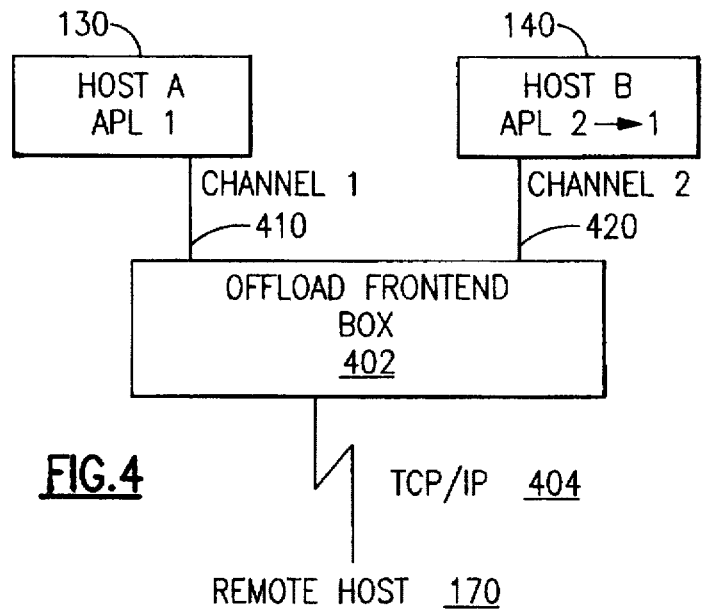
FIG. 4 is a functional block diagram of the present invention illustrating the connection between two hosts and a remote host through an Offload Frontend Box.
Figure 5:
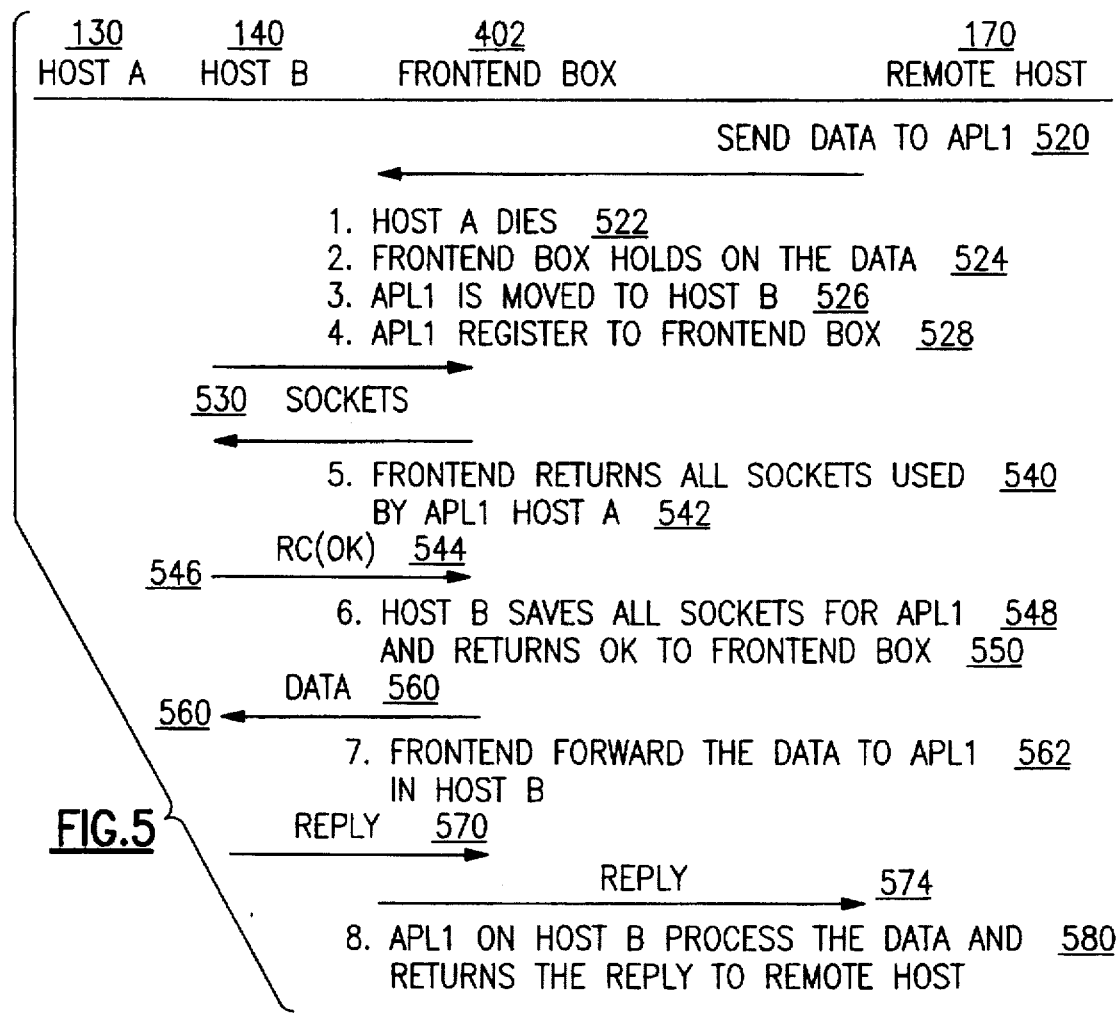
FIG. 5 is a flowchart type diagram illustrating a possible sequence of events after a host outage has been detected.

FIGS. 4 and 5 depict a preferred embodiment of the present invention. Both Figures are an illustration of the functioning of the present invention depicting the procedure that ensues in a sample outage situation. FIG. 4 shows the remote host 170 having a TCP/IP connection 404 to application 1 or APL 1 in Host A 130.

In FIG. 4 loosely coupled hosts A and B 130, and 140 respectively, are connected to the TCP/IP Offload Frontend Box 402 and all physical and logical connections are established between the hosts and the Offload Frontend Box. An application running on a host, such as Apl 1, registers its existence with the Offload Frontend Box, for example through sending a socket bind () call (empty parenthesis reflect the parameters to be passed) to the Offload Box. When the Offload Frontend Box receives this information from the host, it stores it for it future use. (In one embodiment, the Offload Frontend Box builds an incore table for holding information about a host application port number, local socket descriptor, host socket descriptor and an assigned address that associates with the host. All such information is kept in the core report until the Offload Box is powered off.)

A TCP connect request generally arrives at the Offload Frontend Box with the port number of a host application and an IP address of a host waiting to be accepted by the host application. The host application then acknowledges the request, for example by issuing an accept () call, to the Offload Frontend Box. The Offload Frontend Box checks the information provided such as the port number and the (IP) address before assigning a new socket descriptor for the connection. This new socket descriptor associates the local host application to the remote host application connection.

During normal operations, once the connection is established, data sent by hosts is passed with certain parameters to the Offload Frontend Box. The Offload Frontend Box then looks at the parameters passed along with the data and forward the data to the internet. For data arrived at the Offload Frontend Box, the Offload Frontend Box looks at the IP address, searches the information previously provided, such as information stored in the incore table, and determines the one host that is appropriate for delivery of the data. The Offload Frontend Box also looks at the port number and identify the application running on the host. In this way whenever the host application issues a command the Offload Box delivers the data to that application. For example if the issued command is a receive () call, the Offload Frontend Box knows to deliver the data to that particular receive () call based on the socket descriptor previously stored. Between data arrived at the Offload Box and host application issuing a receive () call to consume it, the data is queued in the Offload Frontend Box.

The Offload Frontend Box 402 detects an error when the physical or logical connection to a host is broken. Therefore, as shown in FIG. 4, the Offload Frontend Box in this situation will detect an error through the channel connectivity 410 when Host A takes an outage (or the Frontend Box detects some other problem with Host A). In that situation the Offload Frontend Box first marks all TCP connections in the incore table relating to the host as temporarily out of service and starts a timeout clock as well. In this way the Offload Frontend Box holds all socket connections to the Apl 1 of Host A and waits for APL 1 to show up on Host B 140 (524 in FIG. 5). When APL 1 is instituted on Host B 526, and APL 1 is somewhat successfully moved to that host (Host B), Apl 1 through Host B registers itself through channel 2 420 to Offload Frontend Box (528 in FIG. 5). (This can be accomplished for example by the application in the new host issuing a socket () and bind () call when the second host is ready to replace the previous host.) The Offload Frontend Box in this way recognizes the application by identifying the port number, even through the application is being presented through a different host.

Once Apl 1 is registered though channel 2, Offload Frontend Box returns all sockets 540 that were previously Associated with APL 1 through channel 1 410 to Apl 1 through channel 2 to Host B. For example, if an incore table is being utilized, the Offload Frontend Box updates the incore table to reflect all TCP socket descriptor changes and refresh the new socket association information. Once Apl 1 in Host B acknowledges 544, 550 the acceptance of sockets, data can be forwarded to Apl 1 and processed 560. Therefore, the remote host has now re-established itself to a new host and the outage or the error condition to the initial connection has had no outage or adverse effects to the remote host. In fact the host outage is transparent to the remote host since Host B now takes over the processing of data and its returning to the remote host 580.

Although a specific embodiment of the invention has been disclosed, it will be understood by those having skill in the art that changes can be made to the specific embodiment without departing from the spirit and the scope of the invention.

What is claimed is:

1. In a loosely coupled environment using TCP/IP communication protocol and having a plurality of hosts connected to a plurality of remote hosts through a communication box, with at least one remote host being in processing communication with at least one host, a method of restoring said processing communication after a failure, without a need for re-initiating communication protocols for re-establishing processing communication and without losing any processing information, the steps comprising:

performing an initialization step to identify all hosts and all remote hosts present in said loosely coupled environment;

offloading all TCP/IP communication protocol information relating to said hosts and said remote hosts in an offload frontend box located in said communication box, so that after an error is detected, another host can replace said failing one;

said offload frontend box performing data flow control, error detection, recovery and routing of messages from one node to another node;

maintaining all processing information needed to restore an application running on any host or remote host in processing communication with one another, so that said application can be restored in same exact location on said replacing host as immediately before said failure occurred; and performing a re-registration step during which a working host is located to replace said failing host after said new replacing host announces its availability for said replacement;

said processing information only being passed to said replacement host or replacement remote host after said re-registration step has been completed and in a manner so that said replacement is invisible to any user;

said replacing host signalling said communication box of its availability before said data is transferred from said communication box to said second host; and replacing said host signalling said communication box after said replacing host receives all processing information from said communication box.

* * * * *